United States Patent
Liang et al.

(10) Patent No.: US 9,564,273 B2
(45) Date of Patent: *Feb. 7, 2017

(54) TUNABLE CAPACITOR

(71) Applicant: MCV Technologies, Inc., San Diego, CA (US)

(72) Inventors: Edward C. Liang, San Diego, CA (US); Georgiy Kolomichenko, San Diego, CA (US)

(73) Assignee: MCV TECHNOLOGIES, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/728,940

(22) Filed: Jun. 2, 2015

(65) Prior Publication Data

US 2015/0262756 A1 Sep. 17, 2015

Related U.S. Application Data

(63) Continuation of application No. 13/848,682, filed on Mar. 21, 2013, now Pat. No. 9,048,023.

(51) Int. Cl.
*H01G 5/013* (2006.01)
*H01G 5/14* (2006.01)
*H01G 5/00* (2006.01)
*H01G 5/011* (2006.01)

(52) U.S. Cl.
CPC ............... *H01G 5/14* (2013.01); *H01G 5/00* (2013.01); *H01G 5/011* (2013.01); *H01G 5/013* (2013.01); *H01G 5/0136* (2013.01)

(58) Field of Classification Search
CPC ............ H01G 5/013; H01G 5/00; H01G 5/014

USPC ............ 361/289, 272–273, 277–278, 293.1, 361/283.4, 290–292

See application file for complete search history.

(56) References Cited

U.S. PATENT DOCUMENTS

| | | | |
|---|---|---|---|
| 2,650,351 A | 8/1953 | Ernest Gostyn | |
| 4,325,040 A | 4/1982 | Whitley | |
| 4,361,821 A | 11/1982 | Dubovsky et al. | |
| 4,631,478 A | 12/1986 | Knetsch et al. | |
| 6,236,556 B1 | 5/2001 | Burleson et al. | |
| 6,242,989 B1 | 6/2001 | Barber et al. | |
| 6,275,131 B1 | 8/2001 | Swope et al. | |
| 6,556,415 B1 | 4/2003 | Lee et al. | |
| 6,856,499 B2 | 2/2005 | Stokes | |
| 7,061,745 B2 | 6/2006 | Funk et al. | |
| 7,710,232 B1 | 5/2010 | Stalford et al. | |
| 7,852,066 B2 | 12/2010 | Krammer | |
| 7,876,190 B2 | 1/2011 | Yamamoto | |
| 8,890,543 B2 | 11/2014 | Steeneken et al. | |
| 9,048,023 B2 * | 6/2015 | Liang | H01G 5/013 |
| 2004/0190217 A1 * | 9/2004 | Stokes | H01F 17/0006 361/277 |

(Continued)

*Primary Examiner* — Nguyen Ha
(74) *Attorney, Agent, or Firm* — Mintz Levin Cohn Ferris Glovsky and Popeo, P.C.

(57) ABSTRACT

A tunable capacitor includes a first electrode and a second electrode, each being formed of a conductive material. The tunable capacitor further includes a third electrode between the first electrode and the second electrode, and a dielectric material interposed between the first electrode and the third electrode, and between the second electrode and the third electrode. The third electrode is movable relative to the first electrode and the second electrode by a stepper motor, to adjust and tune a capacitance of the tunable capacitor.

10 Claims, 2 Drawing Sheets

(56) References Cited

U.S. PATENT DOCUMENTS

2011/0170226 A1 7/2011 Oakes et al.
2014/0285285 A1 9/2014 Liang et al.
2014/0285298 A1 9/2014 Liang et al.

* cited by examiner

TUNABLE CAPACITOR

CROSS-REFERENCE TO RELATED APPLICATIONS

This application claims priority to and the benefit of U.S. patent application Ser. No. 13/848,682 which was filed on Mar. 21, 2013 and which is incorporated herein by reference in its entirety.

BACKGROUND

This document describes a tunable capacitor, and more particularly to production of electrical components for electrical circuits, specifically for precision Radio Frequency (RF) applications.

A capacitor is a device for storing electrical energy. The amount of stored energy is defined as a capacitance of the capacitor, which is measured in units of Farads. Some capacitors can be tuned, i.e. having a variable capacitance, but adjustable to a particular capacitance. Such tunable capacitors are sometimes referred as variable capacitors, trimmer-capacitors, or simply "trimmers".

Trimmers come in a variety of sizes and levels of precision. The capacitance of trimmers can be adjusted with a small screwdriver, in which several turns of an adjustment screw can reach a desired end value, allowing for some degree of accuracy. Conventional trimmers include two electrically conductive electrodes separated by a dielectric material, and the distance between the electrodes and/or dielectric material affects the capacitance. To tune a trimmer, the distance between the electrodes or overlapping area of the electrodes is changed, and results in changing the capacitor's capacitance. The following formula governs such changes:

$$C = \frac{\varepsilon \cdot S}{d}, \quad (1)$$

where
C—capacitance of the trimmer,
∈—dielectric constant of dielectric,
S—overlapping area,
d—distance between the electrodes Conventional trimmers, however, are not very accurate, and have limited range of capacitance value. Further, they do not allow automatic digital control of the capacitance value with high accuracy, as is required for such applications as tunable RF filters.

SUMMARY

This document presents a tunable capacitor that overcomes the limitations of conventional tunable capacitors and trimmers. The tunable capacitor of the present disclosure is highly accurate, provides a large range of capacitance value, and allows for automatic digital control of the capacitance value. Further, the tunable capacitor described herein has high power handling capability.

In some implementations, a tunable capacitor is embodied as a mechanically tunable trimmer, in which a capacitance of the tunable capacitor can be adjusted or tuned by means of an external control. The external control can be a mechanical driver powered by a stepper motor. In preferred instances, the stepper motor motion is controlled digitally from a computer in communication with the stepper motor.

In one aspect, a tunable capacitor is disclosed. The tunable capacitor includes a first electrode and a second electrode, wherein each of the first and second electrodes are formed of a conductive material. The tunable capacitor further includes a third electrode between the first electrode and the second electrode. The tunable capacitor further includes a dielectric material interposed between the first electrode and the third electrode, and between the second electrode and the third electrode. The third electrode is movable relative to the first electrode and the second electrode by a stepper motor, to adjust and tune a capacitance of the tunable capacitor.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a tunable capacitor, and more particularly a mechanically tunable capacitor having high accuracy in the designed range. Further, the tunable capacitor described herein provides a large range of capacitance value and allows for automatic digital control of the capacitance value.

Figure 1:
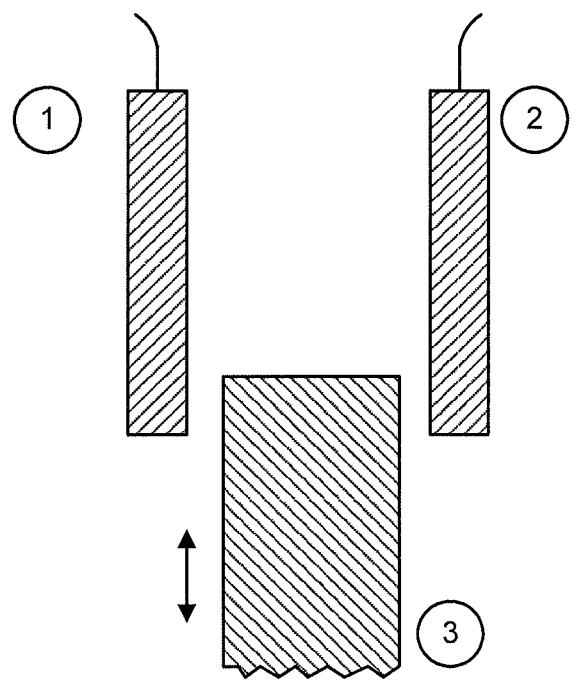
FIG. 1 illustrates a tunable capacitor in accordance with implementations of the present disclosure.

In accordance with some implementations, as shown in FIG. 1, a tunable capacitor 100 includes two fixed electrodes 1 and 2, and a sliding electrode 3 provided between the two fixed electrodes 1 and 2. The tunable capacitor 100 is equivalent to two variable capacitors connected in series. When the sliding electrode 3 is in a lowest position, i.e. furthest displaced from the two fixed electrodes 1 and 2 as shown in FIG. 1, then the capacitance is minimal. However, when the sliding electrode 3 is in a highest position, i.e. most overlapping with the two fixed electrodes 1 and 2, the capacitance is maximal.

Depending on the relative position of the electrodes, the tunable capacitor 100 provides capacitance for certain values within a particular designed range. The sliding electrode 3 is attached to a stepper-motor that moves the sliding electrode 3 between the electrodes 1 and 2, without touching them. The gap between the first fixed electrode 1 and the sliding electrode 3, and between the second fixed electrode 2 and the sliding electrode 3 may be air or filled with any RF dielectric, such as Teflon, or other suitable material.

The high accuracy provided by the tunable capacitor 100 is provided by the fixed (not movable) capacitor plates 1 and 2, contrary to other technologies where one or two capacitor plates are movable. The sliding electrode 3 is movable, and is not electrically connected to any circuit (or ground); it is an electrically isolated electrode, which is easier to move without compromising electrical performance.

Further, the gaps between the electrodes need not be kept constant for higher accuracy, as is the case for some conventional capacitors. Assuming that the central electrode deviates from its central position to one side, the gap between one of the fixed electrodes 1 or 2 and the sliding electrode 3 is decreased. Accordingly, this results in increased capacitance, according to the formula (1). Concurrently, the gap between the central sliding electrode 3 and the other fixed electrode 2 or 1 is increased, which results in decreased capacitance, according to formula (1). Thus, due to the series connection of the two capacitive arrangements, created by the two gaps as shown in FIG. 1, the total capacitance remains substantially unchanged. The fixed electrodes 1 and 2, and the distance between the sliding electrode 3, compensate each other as shown in formula (2):

$$\frac{1}{C_{tot}} = \frac{1}{C_1} + \frac{1}{C_2}, \quad (2)$$

where: $C_{tot}$ is the total capacitance of the tunable capacitor, $C_1$ is the capacitance between the central electrode (3) and the side electrode (1)

$C_2$ is the capacitance between the central electrode (3) and the side electrode (2)

Figure 2A:
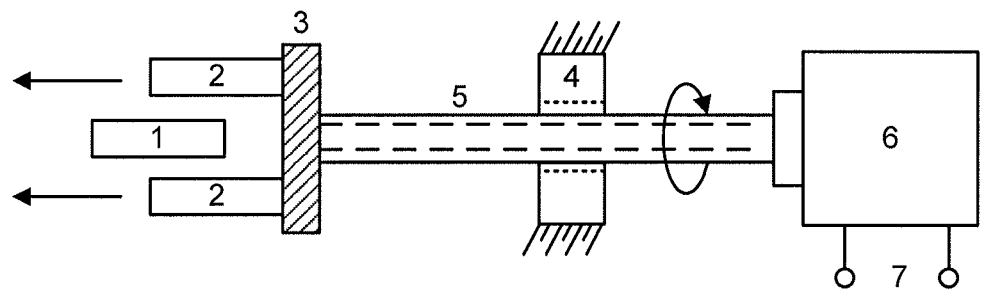
FIGS. 2A-2C illustrate various mechanisms for implementing a tunable capacitor.
Figure 2B:
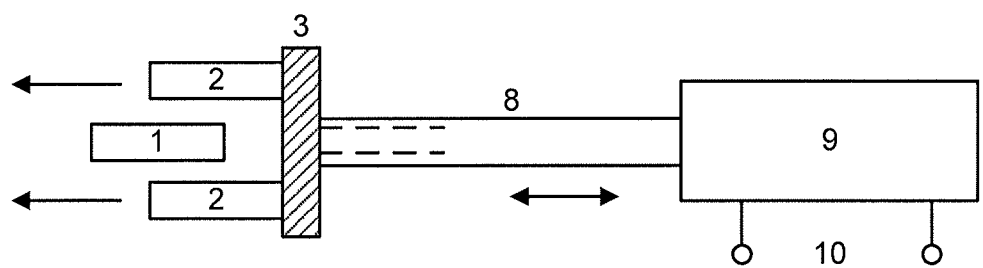
Figure 2C:
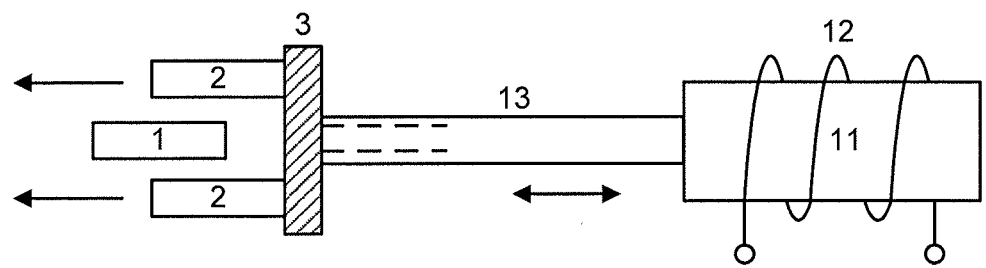

In other implementations, a tunable capacitor 200 includes a fixed electrode 100 and two movable electrodes 200, which are movable to slide relative to the fixed electrode 100. As shown in FIGS. 2A-2C, the fixed electrode 100 is fixed by any fixing mechanism.

FIGS. 2A-2C show a tunable capacitor 200 in which movable electrodes 200 are connected together by a traverse 300. The traverse 300 is preferably formed of a non-conductive material. The traverse 300 is connected to both movable electrodes 200 and preferably aligns and spaces the movable electrodes 200 relative to the fixed electrode 100. The movable electrodes 200 are movable according to any number of moving mechanisms, the preferred of which are described below.

FIG. 2A shows a tunable capacitor 200 that includes a threaded nut 4 which receives and cooperates with threaded screw 5, which is turned and controlled by stepper motor 6. The stepper motor 6 can be controlled via electrical terminals 7, which can supply electrical pulses from a computer controller to the stepper motor 6. The electrical pulses can include a control signal to turn the threaded screw 5 clock-wise or counter clock-wise, to move the movable electrodes 200 closer over the fixed electrode 100 or away from the fixed electrode 100, respectively.

FIG. 2B shows the tunable capacitor 200, which includes a linear actuator 9 to control a push-pull rod 8, to push the movable electrodes 200 closer over the fixed electrode 100 or pull the movable electrodes 200 away from the fixed electrode 100, respectively. The linear actuator 9 can be controlled via electrical terminals 10, which can supply electrical pulses from a computer controller to linear actuator 9. The electrical pulses can include a control signal to incrementally push out or pull back the push-pull rod 8. FIG. 2C shows a tunable capacitor 200 in which a push-pull rod 13 is controlled by magnet 11, around which a coil 12 is wound. Direct current signals form an external source, such as a computer or other logical controller, controls a magnetic force exerted on the push-pull rod 13. These implementations provide accuracy of precision motion and do not require a high control voltage like many conventional trimmers.

In preferred implementations, control voltage terminals and the RF signal terminals are separated, which does not require a DC block circuit. As a result, the quality of the tunable capacitor is much higher than conventional designs. In addition, the tunable capacitor described herein, especially as shown in FIGS. 2A and 2B, has no springs and is insensitive to vibration. The capacitive value does not depend on a position of the tunable components, and therefore any error is eliminated.

The tunable capacitor can handle high power, and has a dielectric strength to be able to withstand 1000 volts or more. In preferred implementations, the tunable capacitor uses an aluminum oxide, or "alumina" dielectric having a dielectric constant of approximately 9.5. Other dielectric materials can be suitably used, such as polytetrafluoroethylene, otherwise known as Teflon®, for example. Referring back to the exemplary implementation shown in FIG. 2C, for example, a gap between electrodes 1 and 2 requires a dielectric thickness of approximately 0.010", and the dimensions of electrodes are approximately 0.400"×0.200". Accordingly, the overall dimensions of the capacitor is 0.400"×0.400"×0.100". Of course, these dimensions are exemplary, and actual dimensions could vary by up to 10% or more from those disclosed.

The tunable capacitor described herein that uses alumina dielectric can withstand up to 1055V or more, while a tunable capacitor using a Teflon dielectric can withstand up to 4700V or more. Accordingly, the tunable capacitor described herein can withstand high power as well.

Referring to FIG. 2C as an example, the maximum capacitance is achieved when the electrodes 2 are in the most left position overlapping the electrode 1 completely, and can be calculated as follows:

$$C[pF] = \frac{0.2249 * \in * S[\text{sq. in.}]}{2 * D[\text{in}]}, \quad (2)$$

Where: C is the capacitance in Pico farads;
$\in$ is dielectric constant of the capacitor dielectric, (i.e. 9.5 for Alumina, 2.1 for Teflon);
S is the area of the electrode 2 in squared inches;
D is the gap between electrodes 1 and 2 in inches.
This formula (2) results in maximum capacitance value of approximately 8.5 pF, which is sufficient for an RF application. The minimum value is close to 0 pF.

The break-down voltage for the tunable capacitor in which alumina is used for the dielectric can be given as:

$$V = 13400 \left[ \frac{V}{mm} \right] * 2 * 0.010'' * 3.937 = 1055[V],$$

For a Teflon dielectric, the break-down voltage is even higher, around 4700[V]. The reactive power stored in the capacitor, then, can be calculated using the following formula:

$$P = \frac{C \cdot V^2}{2} = \frac{8.5 \cdot 10^{-12} \cdot 1055^2}{2} = 4.7[\mu W], \quad (3)$$

Dissipating power of a tunable capacitor with Q=500 due to imperfect materials is:

$$P_{dis} = \frac{P}{Q} = \frac{4.7}{500} = 9.5[nW]$$

This is a very small power, and cannot damage the tunable capacitor. However, as described above, power is not the damaging factor; the voltage is. The tunable capacitor can withstand 1055V with alumina and 4700V with Teflon dielectric. Accordingly, the tunable capacitor can withstand high power as well, the threshold of which can be estimated only for a particular application in which the capacitor is used.

Although a few embodiments have been described in detail above, other modifications are possible. Other embodiments may be within the scope of the following claims.

The invention claimed is:

1. A tunable capacitor comprising:
   a first electrode and a second electrode, the first and second electrodes being formed of a conductive material;
   a third electrode between the first electrode and second electrode; and
   a dielectric material interposed between the first electrode and the third electrode, and between the second electrode and the third electrode,
   the third electrode being movable relative to the first electrode and the second electrode by a linear actuator to adjust and tune a capacitance of the tunable capacitor.

2. The tunable capacitor in accordance with claim 1, wherein the dielectric material includes aluminum oxide.

3. The tunable capacitor in accordance with claim 1, wherein the dielectric material includes polytetrafluoroethylene.

4. The tunable capacitor in accordance with claim 1, wherein a thickness of the dielectric material is approximately 0.010 inches.

5. The tunable capacitor in accordance with claim 1, wherein a length and a width of each of the first, second and third electrodes is approximately 0.400 inches by 0.200 inches, respectively.

6. A tunable capacitor comprising:
   a first electrode and a second electrode, the first and second electrodes being formed of a conductive material;
   a third electrode between the first electrode and the second electrode, the third electrode being formed of a conductive material;
   a dielectric material interposed between the first electrode and the third electrode, and between the second electrode and the third electrode; and
   a linear actuator coupled with the first and second electrodes and being responsive to a computer controller to move the first and second electrodes relative to the third electrode to adjust and tune a capacitance of the tunable capacitor.

7. The tunable capacitor in accordance with claim 6, wherein the dielectric material includes aluminum oxide.

8. The tunable capacitor in accordance with claim 6, wherein the dielectric material includes polytetrafluoroethylene.

9. The tunable capacitor in accordance with claim 6, wherein a thickness of the dielectric material is approximately 0.010 inches.

10. The tunable capacitor in accordance with claim 6, wherein a length and a width of each of the first, second and third electrodes is approximately 0.400 inches by 0.200 inches, respectively.

\* \* \* \* \*